(12) United States Patent
Kukuruda

(10) Patent No.: US 11,319,717 B1
(45) Date of Patent: May 3, 2022

(54) MEASURING AND MARKING SYSTEM

(71) Applicant: Edward Kukuruda, Cerittos, CA (US)

(72) Inventor: Edward Kukuruda, Cerittos, CA (US)

( * ) Notice: Subject to any disclaimer, the term of this patent is extended or adjusted under 35 U.S.C. 154(b) by 215 days.

(21) Appl. No.: 16/915,030

(22) Filed: Jun. 29, 2020

Related U.S. Application Data

(60) Provisional application No. 63/045,331, filed on Jun. 29, 2020, provisional application No. 62/868,064, filed on Jun. 28, 2019.

(51) Int. Cl.
| | | |
|---|---|---|
| *G01B 3/14* | (2006.01) | |
| *E04G 21/18* | (2006.01) | |
| *E04F 21/00* | (2006.01) | |
| *E04G 15/02* | (2006.01) | |
| *G01B 3/1089* | (2020.01) | |
| *G01B 3/1092* | (2020.01) | |
| *G01B 5/00* | (2006.01) | |
| *G01B 5/02* | (2006.01) | |

(52) U.S. Cl.
CPC ...... *E04G 21/1891* (2013.01); *E04F 21/0015* (2013.01); *E04G 15/02* (2013.01); *E04G 21/1841* (2013.01); *G01B 3/1089* (2020.01); *G01B 3/1092* (2020.01); *G01B 5/0004* (2013.01); *G01B 5/02* (2013.01)

(58) Field of Classification Search
CPC ...... E04G 21/1891; G01B 3/14; G01B 3/1089
USPC ............................ 33/1 G, 613, 645, 562, 563
See application file for complete search history.

(56) References Cited

U.S. PATENT DOCUMENTS

| | | | | |
|---|---|---|---|---|
| 2,567,586 | A * | 9/1951 | Werder | E04G 21/1891 33/562 |
| 3,834,033 | A * | 9/1974 | Pinkard | G01B 3/30 33/563 |
| 3,855,924 | A * | 12/1974 | Morse, Jr. | B05D 1/32 101/127 |
| 4,400,886 | A * | 8/1983 | Bindschatel | B27F 5/12 D10/64 |
| 4,527,337 | A * | 7/1985 | Dreiling | G01B 5/02 D10/64 |
| 5,509,207 | A * | 4/1996 | Harms | B43L 7/12 33/613 |
| 6,070,336 | A * | 6/2000 | Rodgers | G01C 9/28 33/645 |
| 6,530,180 | B2 * | 3/2003 | Edmondson | E04F 21/0015 52/745.1 |
| 6,530,186 | B2 * | 3/2003 | Torstensen | E04F 21/0015 52/127.2 |
| 6,895,684 | B1 * | 5/2005 | Firth | E04G 21/1891 33/562 |
| 7,003,889 | B1 * | 2/2006 | Luciani | E05B 17/06 33/562 |
| 7,269,912 | B2 * | 9/2007 | Muday | F16M 13/02 33/562 |

(Continued)

*Primary Examiner* — George B Bennett
(74) *Attorney, Agent, or Firm* — The Law Office Of Austin Bonderer, PC; Austin Bonderer

(57) ABSTRACT

The disclosure presents templates that can be useful in construction. Embodiments of the templates include a face, and two or more indicators. The indicators are located at one or more predetermined intervals on the face, and each indicator defines a window. Each window is of a predetermined length, and each indicator is coded to indicate that each indicator is located at one of the one or more predetermined intervals.

22 Claims, 13 Drawing Sheets

(56) References Cited

U.S. PATENT DOCUMENTS

| | | | |
|---|---|---|---|
| 8,732,972 B2 * | 5/2014 | Jordan | E04G 21/1891 33/613 |
| 9,151,585 B2 * | 10/2015 | Sanchez | G01B 3/00 |
| 9,435,130 B2 * | 9/2016 | Briganti | E04G 21/1891 |
| 2004/0000061 A1 * | 1/2004 | Tuthill | E04F 21/0015 52/749.1 |
| 2010/0251660 A1 * | 10/2010 | McCann | E04C 3/17 52/677 |
| 2017/0138719 A1 * | 5/2017 | Woodruff | E04G 21/1891 |
| 2020/0292291 A1 * | 9/2020 | Duz | G01B 3/02 |

\* cited by examiner

MEASURING AND MARKING SYSTEM

FIELD OF INVENTION

Embodiments disclosed herein are beneficial to many fields, including construction.

BACKGROUND

Currently, a tape measure, a square, a level, a pencil, and in many cases, a costly assistant are needed to accomplish layout or framing tasks. The tape measure and pencil are often misplaced at the job site, and time is wasted trying to locate them. The tape measure usually requires a second person to assist with the measuring and marking of layout or framing projects. If attempting such projects without assistance, the tape measure end frequently slips off the end of the board that is being measured. Pencil marks are often not able to be seen in the parts of lumber with dark sections. Many people are not skilled in the math required for measuring 16 inches (40.64 centimeters) and 24 inches (60.96 centimeters) on center markings over a long distance and/or in a quick manner. Tape measures are often held in place by stepping on it to hold it stable, but this can break the tape measure or cause the end to slip off the material being measured. Pencil points often break, resulting in a scramble on a job site to sharpen the pencil. Pencil marks often do not stand out on construction materials such as roofing, flooring, stucco, etc.

Finding foundation bolt location and placement is often a difficult job where a user ends up with errant locations and sloppy oblong holes that can lead to the plate cracking and failing due to inaccurate measurements. An immense amount of time is used when measuring for window and door headers and stud locations because of continually having to pull out the tape measure for every measurement. The process creates fatigue and tedious work strain from continued bending up and down throughout the day, which leads to faulty measurements and loss of time and material. Generally, one person is trying to measure and mark for multitudes of procedures resulting in wasted time and material. Improper measurements cause electricians, plumbers, architects, designers, interior decorators, and laymen, to place their object in an undesired location.

BRIEF DESCRIPTION OF THE DRAWINGS

Implementations of the present technology will now be described, by way of example only, with reference to the attached figures, wherein.

DETAILED DESCRIPTION

Figure 1:
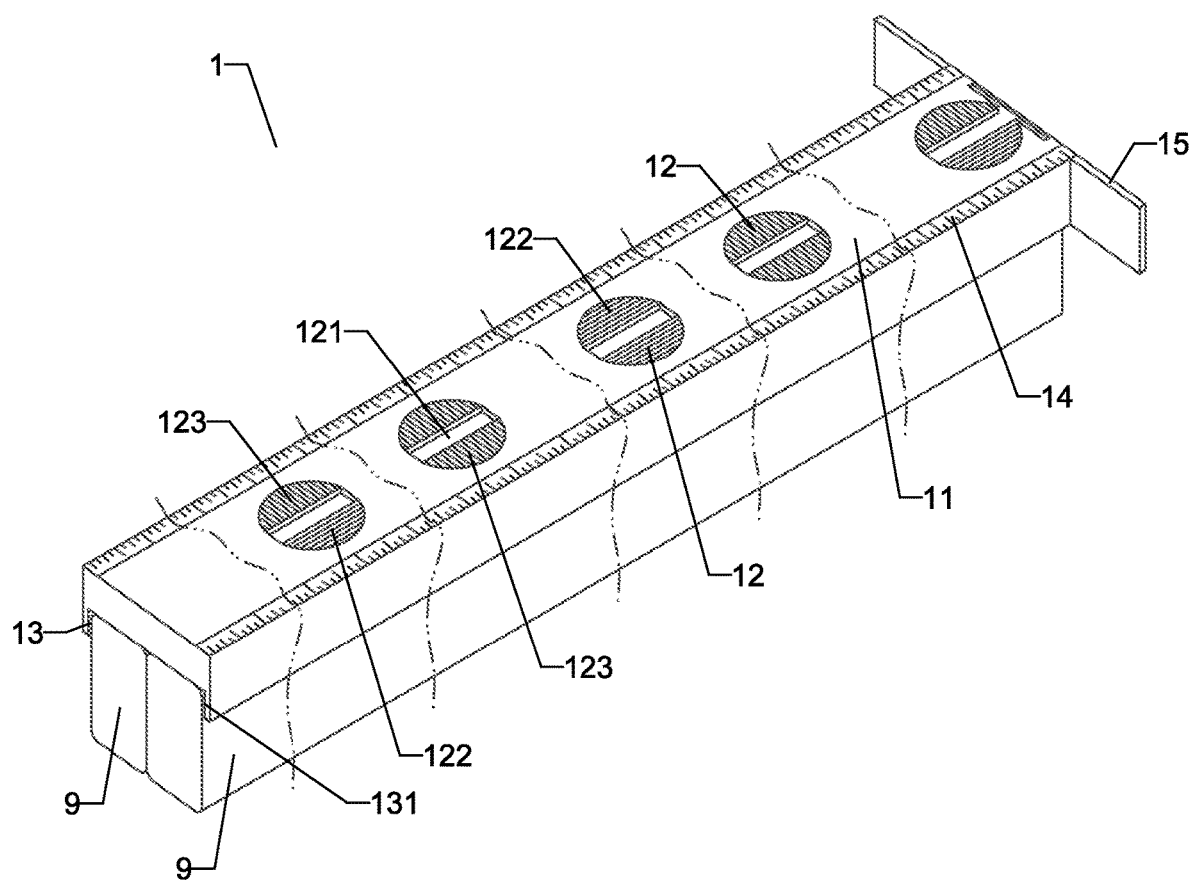
FIG. 1 is an illustrative representation of an embodiment of a framing marking template (also referred to as FMT)

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale, and the proportions of certain parts may be exaggerated to better illustrate details and features. The description is not to be considered as limiting the scope of the embodiments described herein. It should be noted that references to "an" or "one" embodiment in this disclosure are not necessarily to the same embodiment, and such references mean at least one.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "outside" refers to a region that is beyond the outermost confines of a physical object. The term "inside" indicates that at least a portion of a region is partially contained within a boundary formed by the object. The term "substantially" is defined to be essentially conforming to the particular dimension, shape, or other words that substantially modifies, such that the component need not be exact. For example, substantially cylindrical means that the object resembles a cylinder, but can have one or more deviations from a true cylinder.

This disclosure comprises, but is not limited to a, framing marking template 1 (referred to as FMT 1), layout marking template 2 (referred to as LMT 2), foundation bolt template 3 (referred to as FBT 3), marking gun 4, attachments 6, window-door header template 8 (referred to as WDHT 8), and stencil 7.

As can be seen in FIG. 1, the FMT 1 comprises a combination of a measuring scale and alignment device. The FMT 1 can come with increments to frame walls. In some embodiments, the increments comply with established building codes. In some embodiments, the increments are set at 16 inches (40.64 centimeters) on center and/or 24 inches (60.96 centimeters) on center. The FMT 1 having FMT windows 121 occurring in multiple increments can be coded to distinguish the different increments. While disclosed as coded for the FMT 1 and the LMT 2, it is understood that any means to distinguish the different increments, such as, but not limited to, differing patterns, differing colors, and different shapes can be used to indicate the differing increments. The FMT windows 121 are surrounded by FMT indicators 12. In some embodiments, the increments of 16 inches (40.64 centimeters) on center increments can be a first color, and the 24 inches (60.96 centimeters) on center can be a second color. In some embodiments where the increments share a FMT window 121, this shared FMT window 121 has a combination of the two colors. In some embodiments, the increments of 16 inches (40.64 centimeters) on center increments can be a first pattern, and the 24 inches (60.96 centimeters) on center can be a second pattern. In some embodiments where the increments share a FMT window 121, this shared FMT window 121 has a combination of the two patterns. In some embodiments, the windows 121 are the same width as a standard structural member (e.g., 2×4, 2×6 studs), so there is no confusion of where the structural member is placed between the upper and lower plates 9.

The FMT windows 121 are situated such that when a marking is applied, part of the marking will be placed on the upper plate 9, and part of the marking will be placed on the lower plate 9. This enables one to simultaneously mark both plates through the FMT window 121 that is shared by the upper and lower plates 9. The FMT windows 121 can measure at 1½ inches (3.81 centimeters) by ¾ inch (1.905 centimeters) such that ⅜ inch (0.9525 centimeters) of the ¾ inch (1.905 centimeters) wide FMT window 121 is over the upper plate 9 and the remaining ⅜ of an inch of the ¾ inch (1.905 centimeters) wide window is over the lower plate 9.

In some embodiments, FMT 1 can be attached to other FMTs 1, resulting in an extended FMT 1. The length of the templates, and/or extensions can come in many lengths. In some embodiments, the extended FMT 1 can be constructed by four-foot and/or six-foot lengths. The FMT 1 can comprise an FMT stop 15, so the plates 9 can abut to the FMT stop 15 for accurate marking.

In some embodiments, the marking gun 4, a marker marking device, can be used in conjunction with the FMT 1. The marking gun 4, applies a puff of marker into the FMT windows 121 and on the upper and lower plates 9 through the windows 121.

Figure 4:
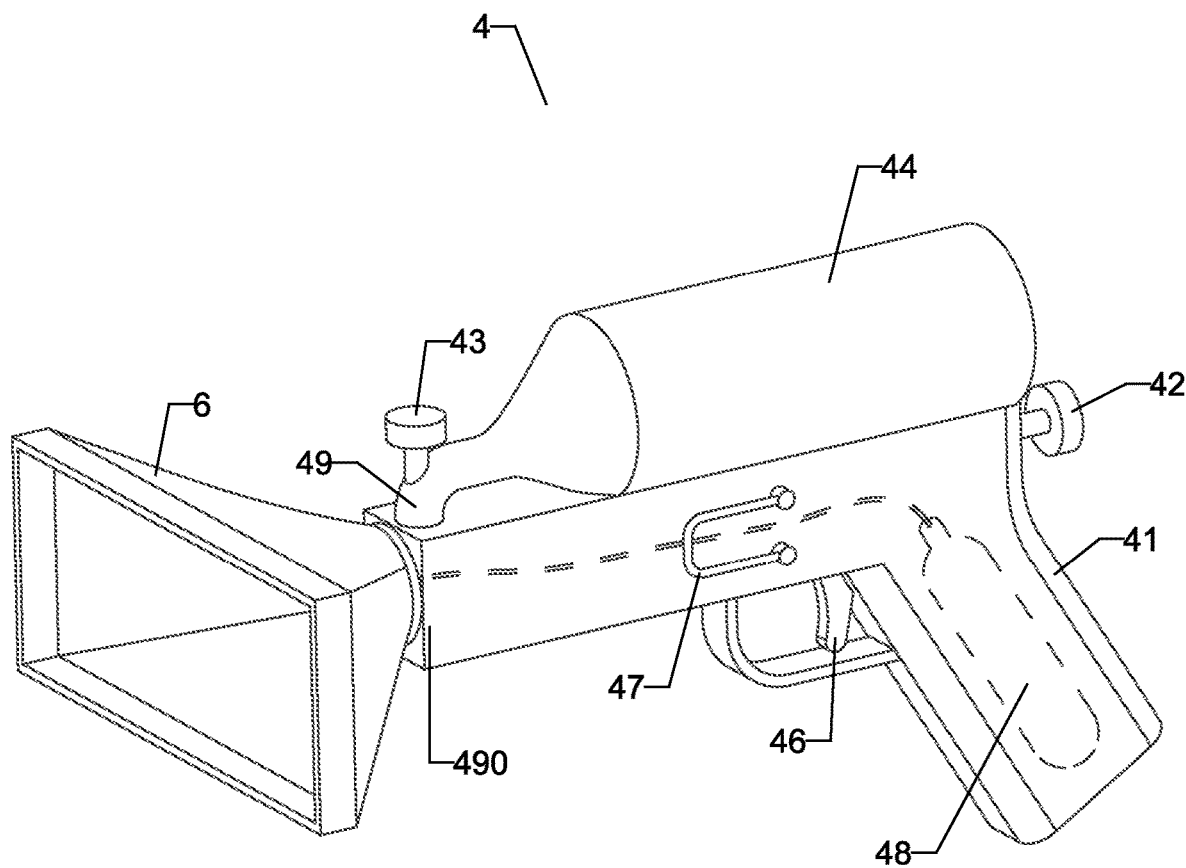
FIG. 4 is an illustrative representation of an embodiment a marking gun.
Figure 5:
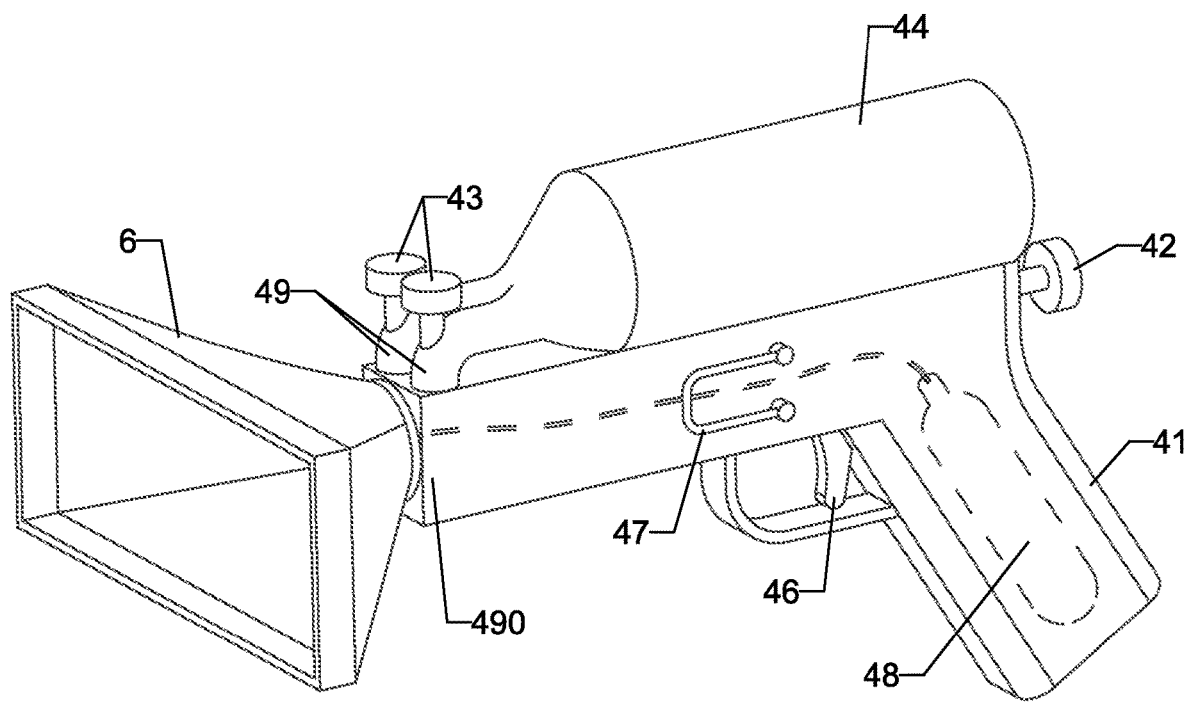
FIG. 5 is an illustrative representation of an embodiment a marking gun.
Figure 6A:
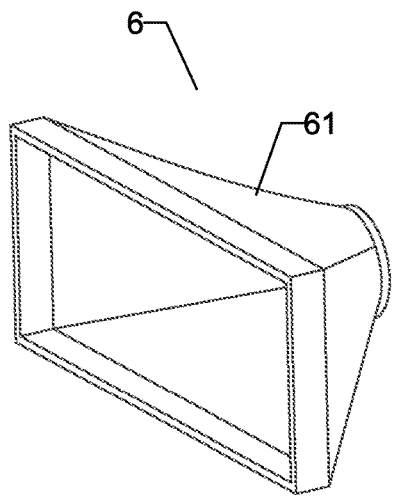
FIGS. 6A-6D are illustrative representations of embodiments of attachments.
Figure 6B:
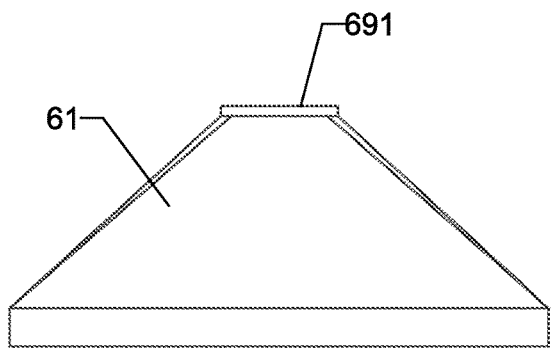
Figure 6C:
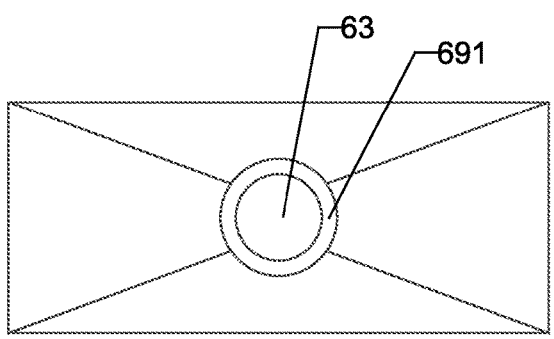
Figure 6D:
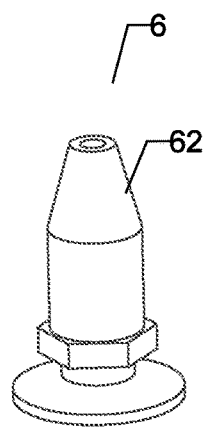
Figure 12:
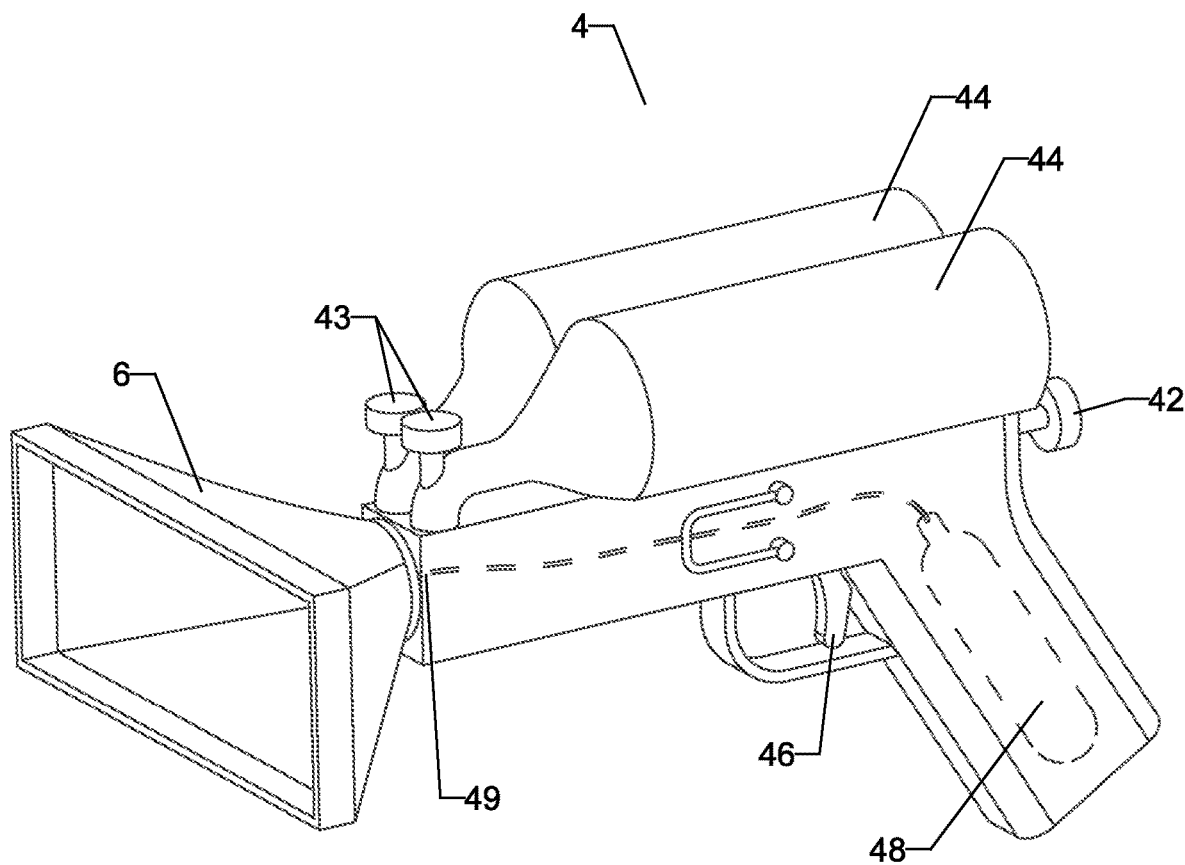
FIG. 12 is an illustrative representation of an embodiment of a marking gun.

As can be seen in FIGS. 4, 5, and 12, a marking gun 4, a marking device, expels a marking substance when actuated. In some embodiments, the marker is chalk. When used with the FMT 1 can be used to apply a marker through the FMT window 121 and onto the plates 9. The marking gun 4 comprises a frame 41. By pulling the trigger 46 on the marking gun 4, a propellant is released and causes the marker to be expelled through the expulsion chamber 490. In some embodiments, the marker container 44 is loaded with marker, and the propellant canister 48 is loaded with $CO_2$. By pulling the trigger 46, the $CO_2$ causes the marker to expel. The marking gun 4 can be used with the FMT 1, LMT 2, FBT 3, and/or WDHT 8. The marking gun 4 can also be used to shoot marker through the instruction stencil 7. A non-limiting list of stencils 7 can be seen below. The marking gun 4 can also be used to mark holes where the output requires a smaller amount of marker. Some uses are, but not limited to, marking holes for mailboxes, gate mounts to walls, railings, wood construction connectors on lumber, and laying out bolt locations on top of foundation forms. Shooting marker into the bracket or hinge holes instead of using a pencil that does not leave a clear and complete mark, or that will not fit through the opening of the hole can be more effective. This is all quickly accomplished by one or more squeezes of the trigger 46. The marking gun 4 can also be used to mark the WDHT windows 81 in the WDHT 8. The marking gun 4 size and output can be set in light of the desired uses. Some embodiments will be smaller for smaller applications, and some will be larger.

In some embodiments, the amount, or range of amount, of marker that is expelled can be determined by the size and amount of marker fed to the expulsion chamber 490. In some embodiments, the FMT window 121 on the FMT 1 is sized, such that a large surface at 1.5 inches (3.81 centimeters)×¾ inch (1.905 centimeters) which can use the volume of the marking gun 4, and attachments 6 thereof. The marking gun 4 can also be used to mark holes with the rubberized tip shown in marking gun attachments 6.

In some embodiments, the marking gun 4 comprises two or more expulsion chambers 490, each fed by a supply tube 49. In some embodiments, each supply tube 49 and/or expulsion chambers 490 have a marker adjustment 43. In some embodiments, when using the rubberized tip to mark holes, the marking gun is capable of shutting off some or all but one outputs as to select the number of expulsion chambers 490 that are used at any given time. In embodiments comprising two or more marker canisters 44, marker adjustments 43 can be used to select which marker is being used. In some embodiments, marker canisters 44 can contain different markers (e.g., differing colors, differing materials).

The marking gun 4 can employ the smaller housing attachment 61 shown in FIG. 6. The housing attachment 61 for the marking gun attachments 6 can be smaller than the housing attachment 61 for the marking gun attachments 6 because, in some embodiments, the window in the templates (121, 221, 81) can be made smaller. The marking gun 4 and smaller windows can be used to use less volume of a marker than at other times. The marking gun 4 and the LMT 2 can be used for finish work. The marking gun 4 can be used with the smaller LMT 2 windows but can also be used to make marks for a multitude of uses by changing to a pointed attachment 62 as an example of attachments 6. The marking gun 4 can also be used to mark holes where the output requires a smaller amount of marker. Some uses are, but not limited to, marking holes for mailboxes, gate mounts to walls, railings, wood construction connectors on lumber, and laying out bolt locations on top of foundation forms. Shooting marker into the bracket or hinge holes instead of using a pencil that does not leave a clear and complete circular mark or that will not fit through the opening of the hole can be more effective. This is all quickly accomplished by one or more squeezes of the marking gun 4 trigger 46. The marking gun 4 can also used to mark the WDHT windows 81 in the WDHT 8. The marking gun 4 can be manufactured in smaller sizes for smaller applications. The marking gun 4 can be made larger for use where more marker is required.

Figure 2A:
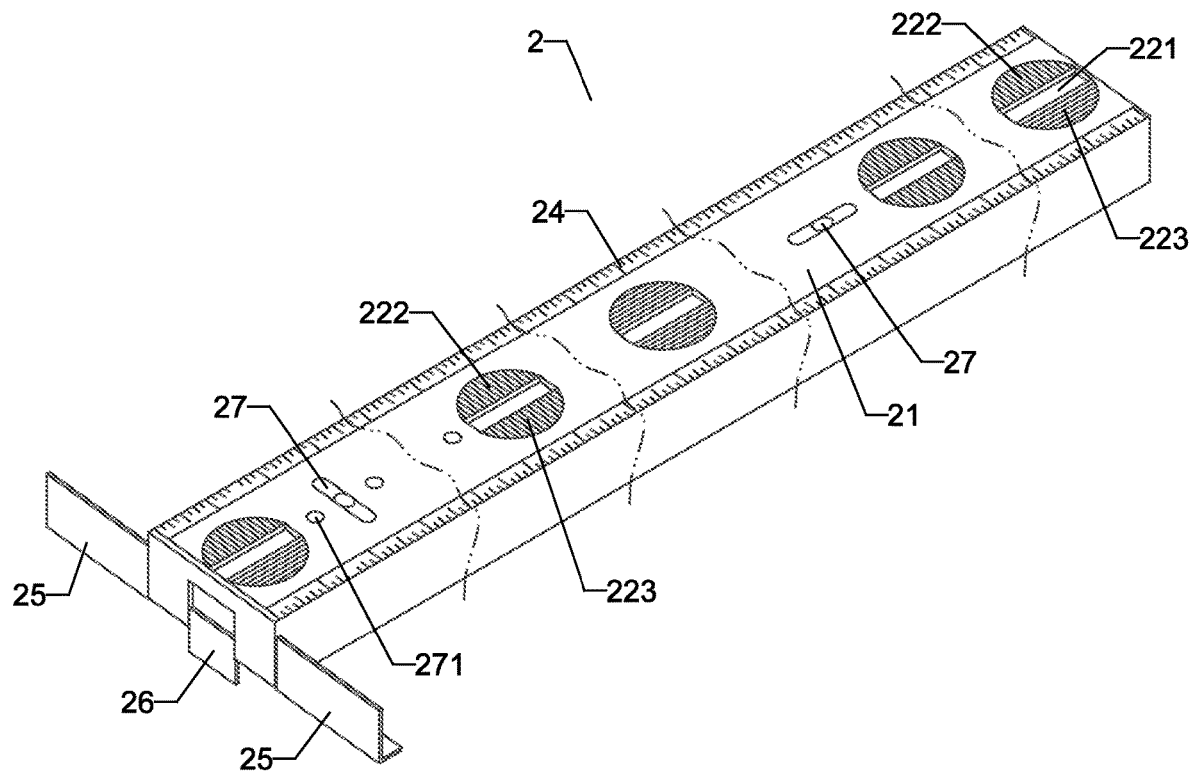
FIGS. 2A and 2B are illustrative representations of embodiments of a layout marking template (also referred to as LMT)
Figure 2B:
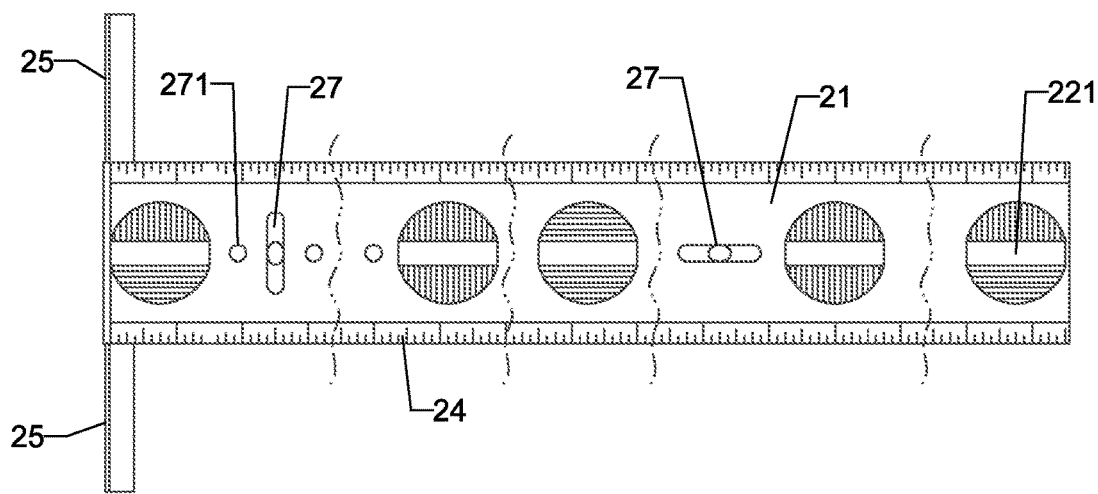
Figure 9:
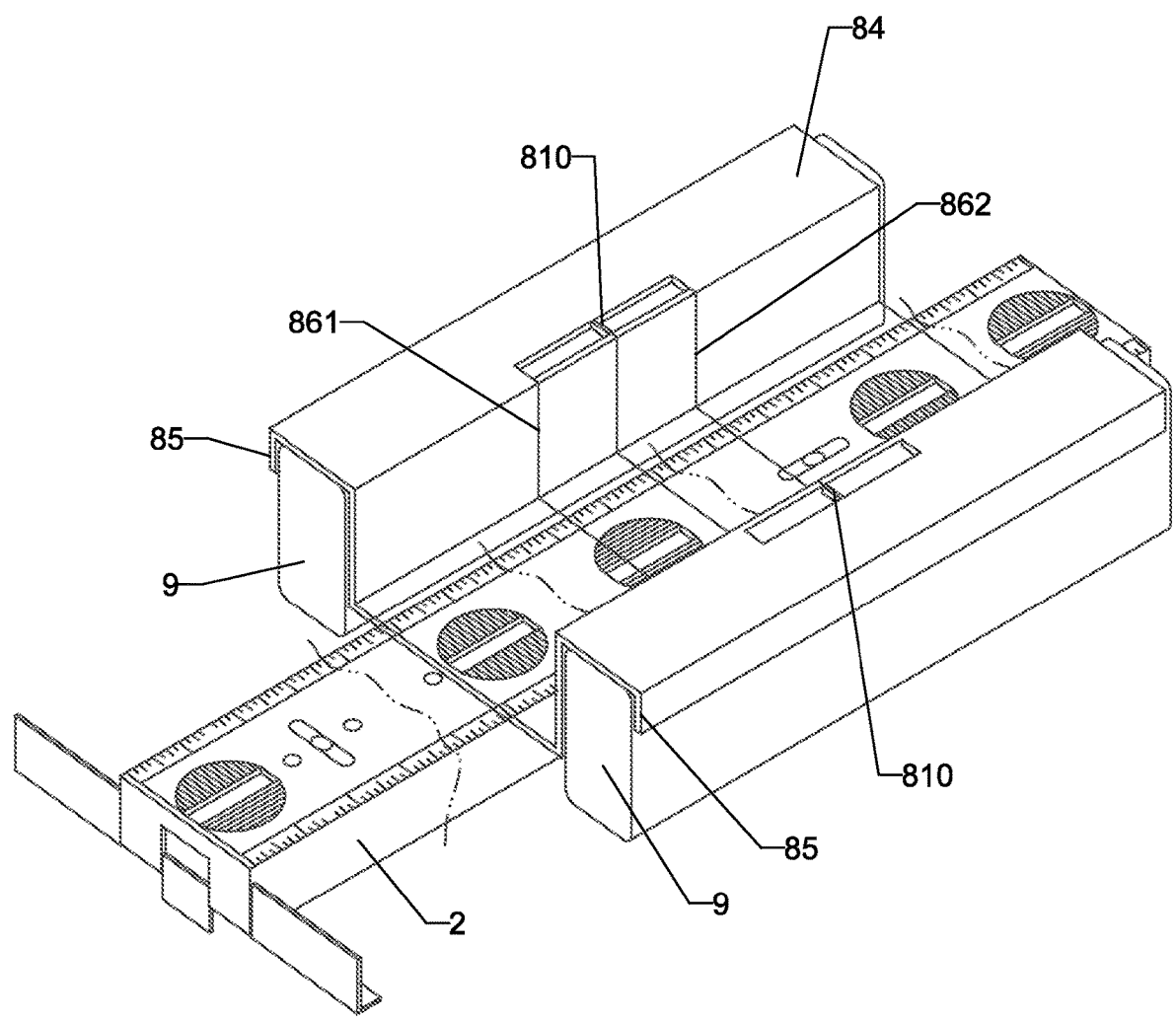
FIG. 9 is an illustrative representation of an embodiment of a window-door header template with an LMT.

As can be seen in FIGS. 2 and 9, the LMT 2 can function as a measuring scale, an alignment device, and a leveling tool. The marking gun 4 is used in conjunction with the LMT 2 to place marks on surfaces. In some embodiments, the marking gun 4 applies a puff of marker through the window of the LMT 2. In some embodiments, the LMT 2 comprises stud layouts of 16 and 24 inches (40.64 and 60.96 centimeters) on center. The LMT 2 can assist with framing ceiling joists, rafters, plumbing, electrical, HVAC and gas layouts by accurately marking entire walls with every stud with the quick reference templates easily with a puff of marker.

Using the LMT 2, hidden studs are easily located along an entire wall for mounting cabinets, TV, or pictures. Hidden rafters in roofing are marked clearly on any roof surface for anchoring solar panels by the LMT 2. Many roof surfaces do not permit marking by pencil or ink marker. When the marker is used, the marker is visible and easily washed away when the project is complete.

If framing lumber was being replaced due to rot or insect infestation and the old piece of window trim holding up an electric awning by previously used screw holes, they can be marked on a new piece of lumber to not change the position of the electric arm and from the output of the marking gun 4 can be shot through the previously used holes forming a perfect replacement using the new lumber. This procedure can be applied to many other replacement situations.

The LMT 2 with fold-out stops 25 allows the LMT 2 to line up with other pieces such as baseboard and crown molding, fascia, and rafters and use it as a tape measure. Either or both of the fold-out stops 25 can be used at any given time.

Therefore, the use of the LMT 2 with or without the marking gun 4 provides for an efficient and accurate way to make necessary markings on long or short pieces. This reduces the cost of labor and materials because of constant remeasuring.

Since the LMT 2 comprises of LMT windows 221 having increments on center markings (e.g., 16 inches (40.64 centimeters) and/or 24 inches (60.96 centimeters)), the layout marking is a helpful tool to install plywood, drywall, recessed lights, safety bars, recessed niches, roof vents or pipes, skylights, ceiling fans, siding, shear wall and more. In some embodiments, the LMT windows 221 are surrounded by LMT indicators 22.

Figure 3:
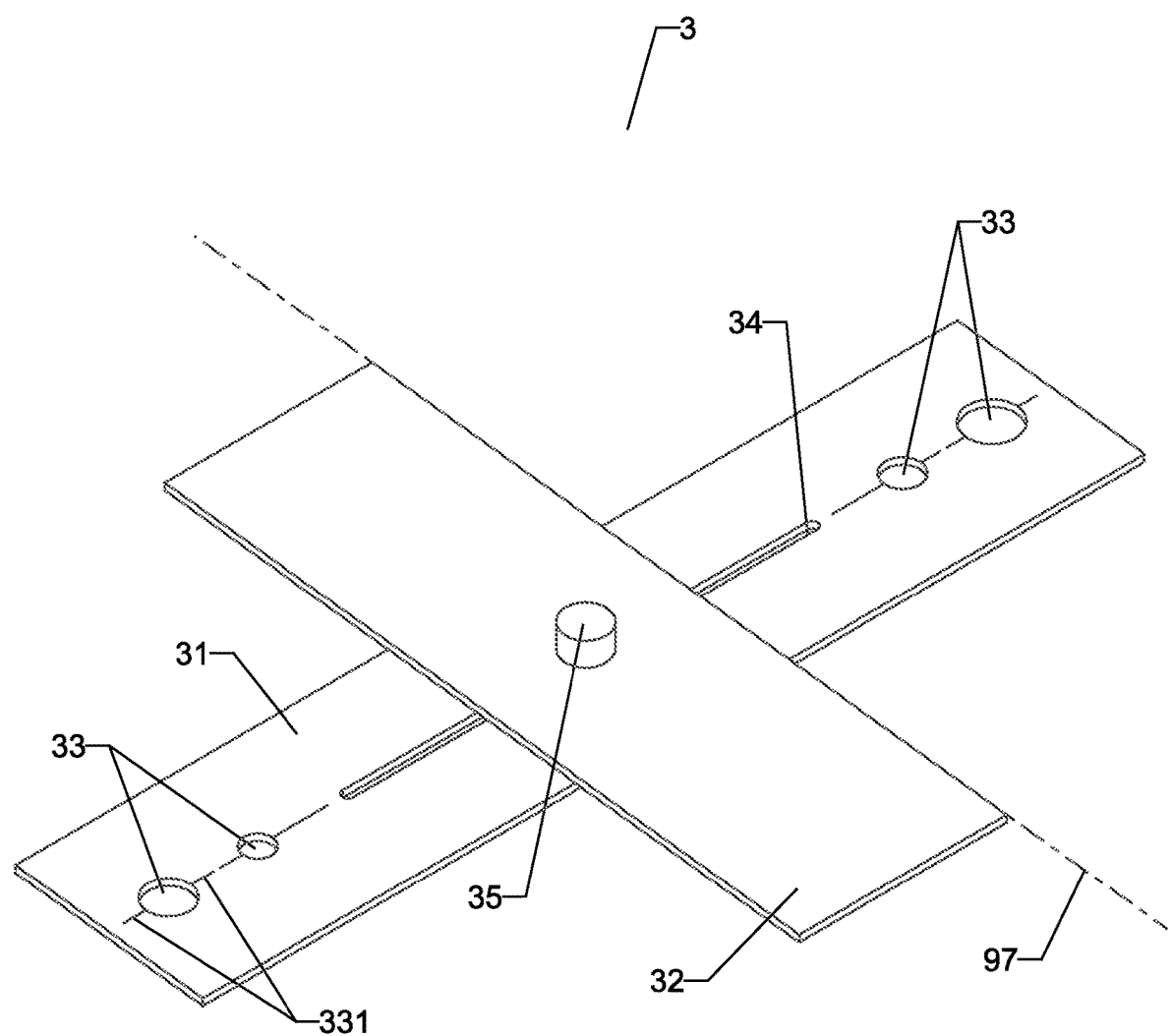
FIG. 3 is an illustrative representation of an embodiment of a foundation bolt template (also referred to as FBT)
Figure 13:
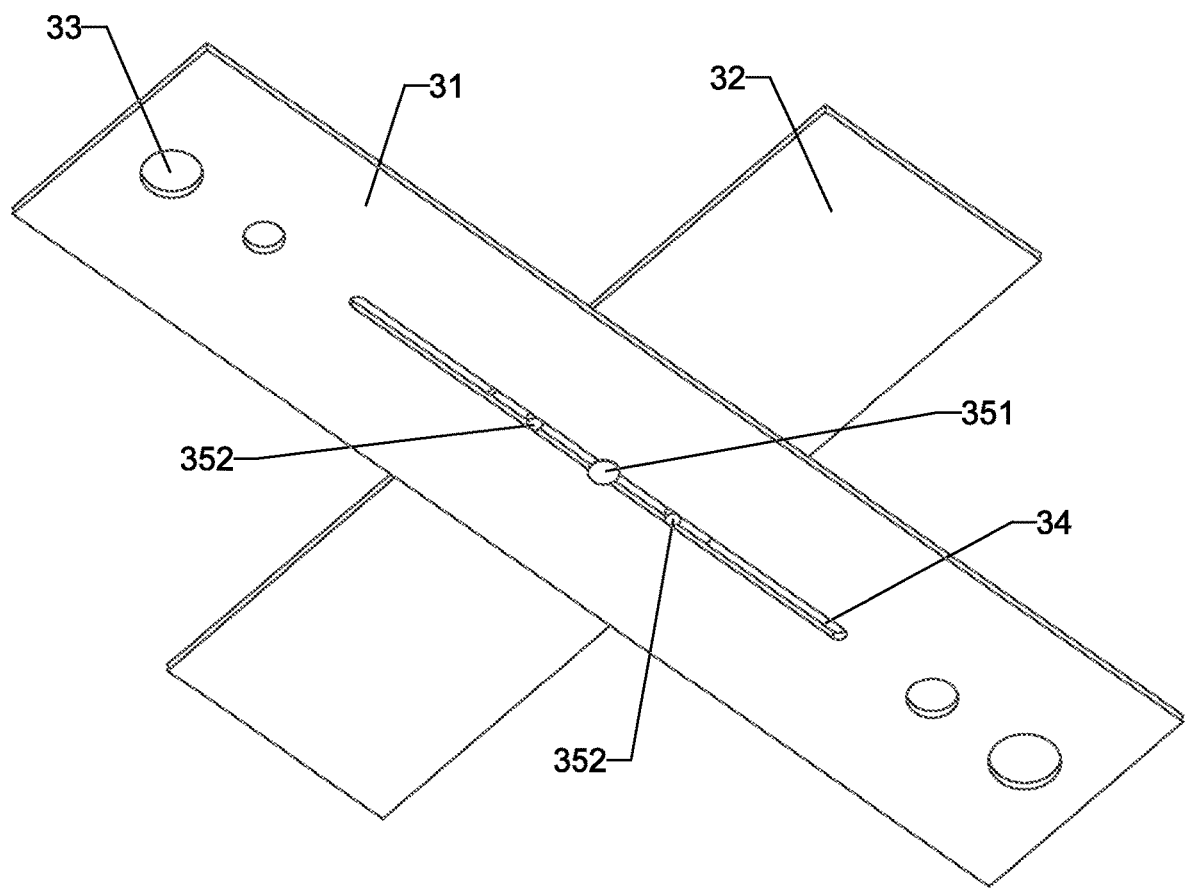
FIG. 13 is an illustrative representation of an embodiment of a foundation bolt template.

As can be seen in FIGS. 3 and 13, the FBT 3 is an embodiment of this present invention. One or more bolt holes 33 sizes for foundations are defined by the FBT base 31 for easy and quick markings for bolts. In some of the embodiments, the bolt sizes are set to the local building codes. The centerline groove 34 is used to pencil in the WDHT centerline 86 to the bolt over the sill plate 9 to create a mark. The alignment lines 331 that surround the bolt holes 33 are lined up with the WDHT centerline 86 of the mark that was applied. The FBT 3 comes with a sliding square 32 that enables a user to adjust the sliding square 32 to get the exact distance from bolt to marker line 97, then tighten the retention element 35, and transfer to the plate 9. Then the marking gun 4 can be used to mark through the circular FBT bolt hole 33 where the bolt is to be drilled. Then this process is repeated until there are no longer any bolts to be positioned on that run. The FBT 3 provides an efficient way to layout bolt locations on the sill plate 9 to be installed without the need for tape measuring. Furthermore, since the location is precise, the use of the FBT 3 eliminates loose-fitting plates 9 or oblong holes because of corrected mistakes or improper measuring.

The LMT 2 can be produced in many lengths that are able to attach to one another to form a unitary LMT 2 of many different lengths but have the ability to be broken down and easily transported.

Figure 8:
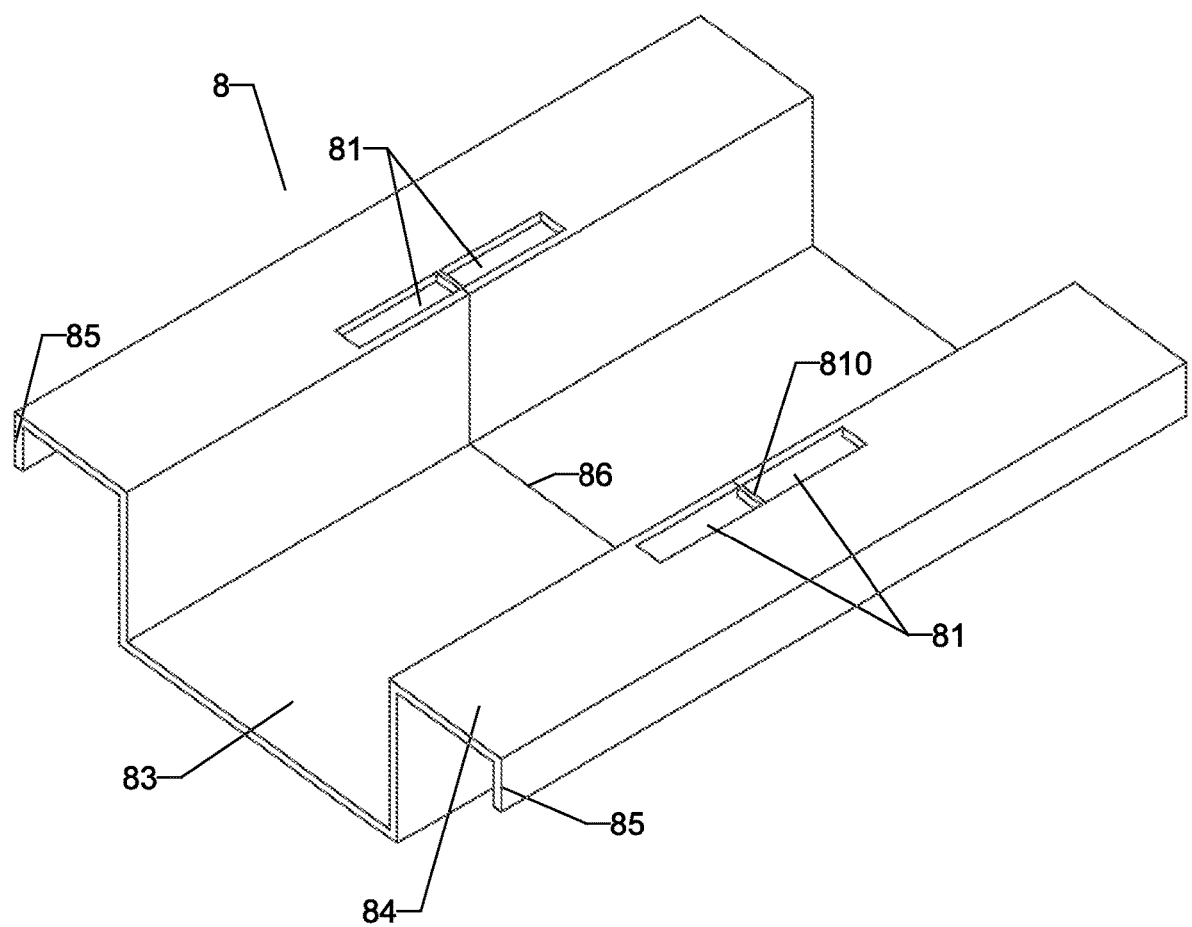
FIG. 8 is an illustrative representation of an embodiment of a window-door header template (also referred to as WDHT)

As can be seen in FIGS. 8 and 9, when using the WDHT 8 to mark the stud locations for window and door headers, the WDHT 8 is placed on top of the plates 9 standing on end, and it can slide along the upper and lower sill plates 9. The process, when used with the FMT 1, the plates 9 are removed from the center of the FMT 1, abut the FMT stops 15 and placed within the receiving area defined by the WDHT wings 84 and WDHT overhangs 85. The WDHT 8 used while the FMT 1 separates the two plates 9. In some embodiments, the WDHT 8 will be designed to accommodate either a 2×4 or a 2×6 plate 9. The WDHT 8 can also be used with the LMT 2, and the plates 9 will abut the fold-out stops. In some embodiments, the window split 810 can have varying shapes such that a user is able to distinguish markings that are made through the FMT windows 121 and/or the LMT windows 221. The window split 810 can act as a stencil and define a mark on the plates when the marker used. In some embodiments, the window split 810 is linear, and, in some embodiments, it has a different shape.

In some embodiments, the WDHT 8 comprises clear material (e.g., plastic). This enables one to read the linear dimension designation (14, 24) underneath the WDHT 8, depending on the design. The progressive scales on the LMT 2 and FMT 1 allow a user to mark all window and door headers, and in some embodiments, up to 24 feet (7.315 meters); however, any length can be produced. Some of the embodiments of the WDHT 8 have three lines that mark the beginning, center, and end of the trimmer and king stud locations 81 of the WDHT 8, when aligned with the WDHT centerline 86 divides the king and trimmer studs. When using the WDHT 8, the beginning and end of king and trimmer studs are easily read on the number scale below on FMT 1 or the LMT 2, as seen in FIG. 9. The king and trimmer stud locations can be marked on the plates 9 with the marking gun 4.

In some embodiments, the WDHT 8 comprises additional lines, a left line 861, located outside the left window, and a right line 862, located outside the right window. When in use, for example, when starting a new wall beginning on the right side and building plans call for a 3 feet (0.9144 meters) opening at 8 feet (2.438 meters), one can locate the trimmer and king stud locations with the WDHT 8. The WDHT 8 is used to quickly layout stud locations. First, when looking at the WDHT 8, there is a left line 861 that will indicate the left side of both studs starting at 96 inches (243.8 centimeters) and a right line 862 that will be located at the right side of both studs. Thus, when the right side of the header is measured, the left line 861 becomes the trimmer stud point, and the right line 862 is the king stud. When the left header studs are located, the template is moved to the left 3 feet (0.9144 meters), the right line 862 becomes the trimmer, and the left line 861 becomes the king stud. At both locations, all 4 windows of WDHT are marked on upper and lower plates after the trimmer and king stud location are identified on the template scale.

Figure 7A:
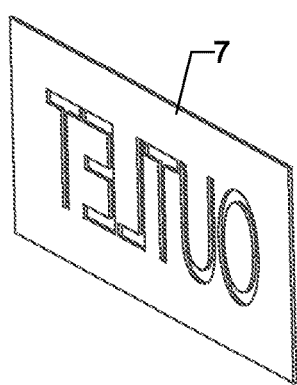
FIGS. 7A-7E are illustrative representations of embodiments of attachments.
Figure 7B:
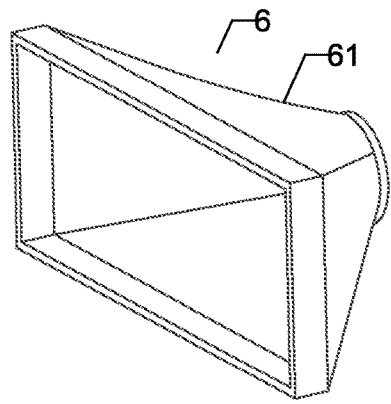
Figure 7C:
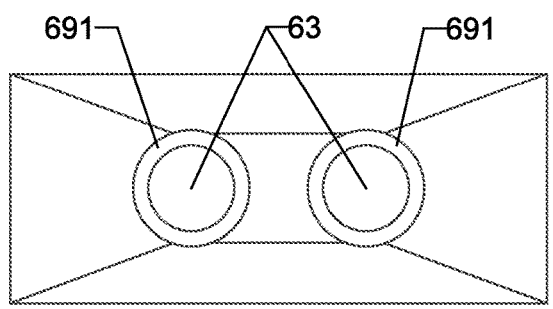
Figure 7D:
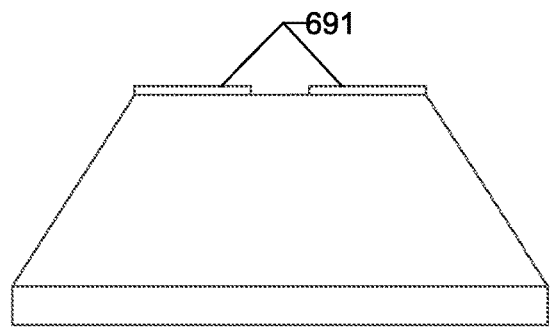
Figure 7E:
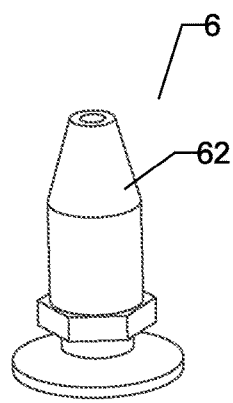

As can be seen in FIG. 7A, instruction stencils 7 can be attached to the marking gun 4. The instruction stencils 7 allow for commands or images to be produced on objects. This is very useful when erecting structures to provide communication with contractors, sub-contractors, and homeowners, among others. The instruction stencils 7 can be used for the marking of the location to be used during the installation of fire sprinklers, gas lines, plumbing, electrical wiring, exhaust fan, security lighting, lighting type, outlet, framing, and wood construction connectors, laying out duct locations HVAC systems, and many other items that are used during construction and now a user no longer need to be present.

In one example, a termite inspector can use the instruction stencils 7 to communicate to the contractor and homeowner. The inspector could mark all bad construction members he comes across with a simple "Replace" stencils 7. This allows the contractor to justify the cost of his/her bid based on the number of "Replace" markings. The homeowner can see the extent of damage by observing the number of marked members. This gives the customer an understanding of the damage and validation for the costs involved. Construction workers can then observe exact locations to be replaced without further input by the contractor.

All the embodiments presented herein can save time and money in every step of construction and other forms of marking that need to be done that this invention can be used for.

In some embodiments, the FMT 1 and LMT 2 can be eight feet long, and in some other embodiments, the templates (1 and 2) come in 6 foot (1.829 meters) and 4 foot (1.219 meters) lengths, which may be able to attach to each other to form a length as desired. In some embodiments, the increments are set at 24 inches (60.96 centimeters) on center. As described, both plates 9 share a single-window ready for one single shot marking from a marking gun 4. The marking gun 4 can mark both upper and lower plates 9 simultaneously through a single FMT window 121. In some embodiments, the FMT window 121 will provide for 1.5-inch (3.81 centimeters) marking on each plate 9. The window 121 for checking upper and lower plate 9 studs making sure they are at the FMT stop 15 before marking begins. In some embodiments, the FMT stops 15 are used when marking header and studs layouts on plates 9 after marking stud locations 16 and/or 24 inches (60.96 centimeters) on center. In some embodiments, a user may need the FMT 1 other extensions that are capable of the layout up to 290 inches (736.6 centimeters) or 24 feet (7.315 meters). In some embodiments, there will be FMT windows 121 for 16 inch (40.64 centimeters) on center markings. In some embodiments, the different increments will be coded, and when the increments overlap, both codes are indicated 122 and 123. When the increments are 16 inch (40.64 centimeters) and 24 inch (60.96 centimeters), the increments share the same window every 48 inches (121.9 centimeters). The inside dimension of the framing channel 13 is designed to accept two plates 9 therein. In some embodiments, the inside dimension of the framing channel 13 is 3¼ inches (0.635 centimeters). The FMT overhang 131 that secures the plates 9 together prior to marking the FMT windows 121 is ⅝ inches (1.587 centimeters). In some embodiments, the length of the FMT window 121 is 1½ inches (3.81 centimeters), and the width is ¾ inch (1.905 centimeters). In some embodiments, the FMT 1 is 1⅞ inches (4.763 centimeters) thick.

In some embodiments, the FMT 1 has linear dimensional designations 14 from one to eight feet in ⅛-inch (0.3175 centimeters) increments and is approximately 3¾ inches (approximately 9.525 centimeters) wide overall width, with overhangs to help secure plates 9 that are bowed and checked.

In some embodiments having windows for both 16 inches (40.64 centimeters) on-center and the 24 inches (60.96 centimeters) on-center share the same window (121 and 221) every 4 feet (1.219 meters); therefore, half of the indicator (12 and 22) is the first code, and the other half is the second code. Although imperial measurements are illustrated here, metric measurements may be equally utilized in embodiments without limitation. In addition, other intervals than 16 inches (40.64 centimeters) and 24 inches (60.96 centimeters) may be utilized, such as 12 inches (30.48 centimeters) on center in embodiments. Thus, any interval may be utilized without limitation.

In other embodiments, an additional FMT 1 may be attached to a first FMT 1 with a magnet and/or ball baring spring mechanism. In some embodiments, the body of FMT 1 has a thickness of equal to, or about, 1¼ inches (3.175 centimeters).

The extensions of the FMT 1 and LMT 2 can have progressive measurements. For example, in one embodiment, the first length of FMT 1 and LMT 2 starts at 1 inch (2.54 centimeters) to 97 inches (246.4 centimeters); the $2^{nd}$ length begins at 97 inches (246.4 centimeters) to 193 inches (490.2 centimeters) inches; the $3^{rd}$ length starts at 193 inches (490.2 centimeters) ends at 290 inches (736.6 centimeters). All the extensions can have lengths and thicknesses that are equal.

In some embodiments, the first coded indicators (122, and 222) are located at 16, inch centers, starting from 1 to 16 inches (2.54 to 40.64 centimeters), 32 inches (81.28 centimeters), 48 inches (121.9 centimeters), 64 inches (162.6 centimeters), 80 inches (203.2 centimeters), 96 inches (243.8 centimeters), 112 inches (284.5 centimeters), 128 inches (325.1 centimeters), 144 inches (365.8 centimeters), 160 inches (406.4 centimeters), 176 inches (447 centimeters), 192 inches (487.7 centimeters), 208 inches (528.3 centimeters), 224 inches (569 centimeters), 240 inches (609.6 centimeters), 264 inches (670.6 centimeters), and 288 inches (731.5 centimeters) on center. The second coded indicators (123 and 223) are for 24 inch (60.96 centimeters) on-center markings starting at 1 inches (2.54 centimeters) to 24 inches (60.96 centimeters), 48 inches (121.9 centimeters), 72 inches (182.9 centimeters), 96 inches (243.8 centimeters), 120 inches (304.8 centimeters), 144 inches (365.8 centimeters), 168 inches (426.7 centimeters), 192 inches (487.7 centimeters), 216 inches (548.6 centimeters), 240 inches (609.6 centimeters), 264 inches (670.6 centimeters), and 288 inches (731.5 centimeters). The 16 inches (40.64 centimeters) on-center and the 24 inches (60.96 centimeters) on-center share the same window at 1 and every 48 inches (121.9 centimeters) the template, thus the indicator has an indication of both, in some embodiments half of the indicator is first code, and the other half is second code. In some embodiments, the first code is a blue color, and the second code is a red color. The spacings can be set as desired, and the examples are shown as they common measurements for building materials. It must be understood that while many items in the construction industry are referred to as a certain size, such as a 2×4, indicating an element that is 2 inches (5.08 centimeters) by 4 inches (10.16 centimeters), have morphed over time to a different size. While this may further change over time, the current standard dimensions for a 2×4 is 1.5 inches (3.81 centimeters) by 3.5 inches (8.89 centimeters). In such a case, the measurements of the embodiments, when dependent upon the measurements of the building material (e.g., the channel 13), will correspond to the actual measurements of the building materials as they are, not how they are named.

In some embodiments, the FMT 1 may be manufactured from a variety of materials, including hardwood, aluminum, rigid plastic, or any combination of these materials.

In some embodiments, the LMT 2 comprise fold-out stops 25. In some embodiments, the length of each fold-out stop 25 is approximately 2.5 inches (approximately 6.35 centimeters) long, and the extension of the fold-out stop 25 to be approximately 0.375 inches (approximately 0.9525 centimeters). The extension can prevent material from sliding under the fold-out stop 25, and the extension can add strength to the fold-out stop 25. Some embodiments of the LMT 2 comprises a slide stop 26 that will help stud layout on drywall and/or plywood. The slide stop 26 assists in marking studs for nailing off or cutting drywall. Some embodiments of the LMT 2 comprises a release 271 for the slide stop 26 and/or the fold-out stops 25. In some embodiments, the fold-out stops 25 are approximately 1 inch (approximately 2.54 centimeters) thick. In some embodiments, the LMT 2 comprises a LMT linear dimensional designations 24. The LMT linear dimensional designations 24 can have the same increments as the linear dimensional designations 14. In some embodiments, the window increments for the LMT windows 221 are the same 16 inches (40.64 centimeters) and 24 inches (60.96 centimeters) markings as the FMT windows 121.

In some embodiments, the LMT 2 is marked with LMT linear dimensional designations 24 from 1 foot (0.3048 meter) to 8 feet (2.438 meters) in ⅛-inch (0.3175 centimeters) increments. The LMT 2 can be approximately 2¼ inches (approximately 5.715 centimeters) wide by approximately 1¼ inch (10.16 centimeters) thick. The LMT 2 can comprise one or more levels 27 located at one or more locations. In some embodiments, there are three bubble levels for every 8 feet (2.438 meters) length, without limitation.

In some embodiments, the LMT 2 will come in 4 feet (1.219 meters), 6 feet (1.829 meters), up to 24 feet (7.315 meters) versions, such at any desired length can be created. The shorter lengths can be used for smaller walls in hallways and smaller sections of the wall or quick reference as a ruler or level. In some embodiments, you can attach the two or more LMTs 2 together to create the desired length. This shorter LMT 2 would come complete with four or six separate 4-foot (1.219 meters) lengths with the same windows and scales as two or three 8-foot (2.438 meters) versions.

In some embodiments, the LMT 2 may be manufactured from a variety of materials, including hardwood, aluminum, rigid plastic, or any combination of these materials.

FIG. 3 is an illustrative representation of an embodiment of a FBT 3. In the figure, the dotted line indicates a marker line 97 that is used to locate the foundation plate 9. The sliding square 32 enables a user to move the sliding square 32 in relation to plate 9 locations to get distances to foundation bolts. The marker line 97 can be determined by selecting 2×4 or 2×6 width and allowing an overhang (e.g., ⅛ inch (0.3175 centimeters)) space to enable the plywood to extend below the cement foundation (e.g., ⅞ inch (2.222 centimeters)). Then place the plate 9 so that it abuts the marker line 97, away from the bolts. The corresponding FBT bolt hole 33, or closest size thereto, is slid over the bolt. Then the user adjusts the sliding square 32 to align with the outer edge of plate 9. The sliding square 32 centerline groove 34 indicates where along the plate 9, the bolt location will be drilled. Once the sliding square 32 is placed in the proper position, the retention element 35 is adjusted so that the position of the sliding square 32 and FBT base 31. A line is then drawn across the plate 9 using centerline groove 34 that is perpendicular to the plate 9, and after the line is made across plate 9, the sliding square 32 is adjusted to sit on the plate 9 to get the distance to the bolt. Remove the FBT 3 from the bolt and align the sliding square with the edge of the plate and alignment lines 331 with the line that was drawn across the plate 9 and make a mark through the bolt hole 33 onto the plate 9. In some embodiments, the sliding square 32 is sized such that it has the same width as a predetermined plate 9, and in some embodiments, the predetermined plate 9 size is a 2×4 or a 2×6.

In some embodiments, the FBT 3 defines bolt holes 33 for standard foundation diameter bolts. In some embodiments, the FBT base 31 can be 15⅞ inches (40.32 centimeters) long and 2½ inches (1.27 centimeters) wide and ⅛ inches (0.3175 centimeters) thick; and the sliding square 32 can be 11⅞ inches (30.16 centimeters) long by 3¼ inches (1.27 centimeters) wide and ⅜-inch (0.9525 centimeters)-thick.

In some embodiments, the FBT base 31 and the sliding square 32 are set perpendicular to each other. In some embodiments, projections 352 reside in the centerline groove 34, and the projections 352 prevent rotation of the sliding square 32 in relation to the FBT base 31. In some embodiments, the sliding square 32 will have an internal opening in which the FBT base 31 is able to slide in a linear fashion. In some embodiments, the retention element base 351 is located on the underside of the sliding square 32 and engages the retention element 35 to increase the friction between the sliding square 32 and the FBT base 31. In some embodiments having the FBT base 31 located in an internal opening in the sliding square 32, the retention element base 351 will abut the underside of the sliding square 32 and enable the fixing of the FBT base 31 in relation to the sliding square 32. In some embodiments, the sliding square 32 has a portion or extensions, that is present below the FBT base 31, such that the sliding square 32 is able to abut the edge of a plate that is underneath the FBT base 31.

FIG. 4 is an illustrative representation of an embodiment of a marking gun 4 having one marker supply tube 49. In some embodiments, the frame is approximately 11 inches (approximately 27.94 centimeters) in length. The marking gun 4 has a single marker supply tube 49 from the marker container 44. The marker supply tube 49 and the propellant canister 44 is coupled to the expulsion chamber 490. The marker is supplied via venturi effect, in some embodiments, a "V" channel 13 in communication with the output that keeps the marker centered in the propellant path of $CO_2$. The venturi effect is created when the trigger 46 is pulled, and propellant rushes through, pushing and pulling the marker out the exit point. The pulling can also draw another portion of the marker to be used in the venturi chamber. In some embodiments, the attachments 6 can comprise a screen therein to help with the dispersion of the marker. The attachment 6 also gives a user access to clean and check operation. In some embodiments, the gun also comprises propellant adjustment 42, which can adjust the flow of gas, and/or marker adjustment 43, which can adjust the flow of marker. Some embodiments comprise a belt hook 47. In some embodiments, the marking gun 4 comprises a ring magnet that receives and holds the selected attachments 6 for options in applying the marker. In other embodiments, the marking gun 4 comprises a magnet. In other embodiments, both the marking gun and the attachment 6 comprises a magnet 691. In some embodiments, the magnets are placed around the input and/or output of the attachment 6 and/or the marking gun 4.

In some embodiments, the marking gun 4 comprises a frame that is approximately 11 inches (approximately 27.94 centimeters) in length has a supply line from the marker container 44 that supplies the expulsion chamber 490. The marking gun 4 is powered by a $CO_2$ propellant supply. The gun can also comprise propellant adjustment 42 and/or marker adjustment 43.

In some embodiments, the propellant canister 48 comprises a carbon dioxide cartridge that is often used in propellant-powered guns (BB and pellet guns). When the trigger 46 is pressed, the marker is expelled with force by the pressurized gas burst.

FIG. 5 is an illustrative representation of an embodiment of a marking gun 4 comprises two supply tubes 49 that feed the marker into the expulsion chamber 490. In some embodiments, one or both marker supply tubes 49 can be adjusted or closed to limit the amount of marker that is expelled from the marking gun 4 by using the marker adjustment 43. The marker supply tube 49 and the propellant canister(s) 48 are coupled to the expulsion chamber 490 having dual outputs. The marker, fed by the marker supply tubes 49, sits on the expulsion chamber 490. In some embodiments, the expulsion chamber 490 comprises a channel that is able to create a venturi effect in two chambers. Some embodiments, the marking gun 4, comprises a propellant adjustment 42 and/or marker adjustment 43. In some embodiments, the marking gun 4 comprises a belt hook 47. In some embodiments, the marking gun 4 comprises a magnet that receives and holds the selected attachment 6 in place to preform desired mark 62 needed for the project.

The marking gun 4 comprises one or more an easily refillable marker containers 44. In some embodiments, the marking gun 4 comprises one or more propellant canisters 48. When the trigger 46 is actuated, the marker is expelled with force by the propellant from the propellant canister 48. In some embodiments, the one or more propellant canisters 48 are air gun CO2 cartridges.

FIGS. 6A-6D and 7A-7E, provide an illustrative representation of some embodiments of attachments 6. In some embodiments, the attachments 6 comprise one or more ring magnets and/or plastic portions. The attachments 6 are used to direct the marker flow from the gun to the desired area and/or the desired form. A housing attachment 61 (in some embodiments, it is 1½ inches (3.81 centimeters) by ⅜ inch (0.9525 centimeter)) is used for marking the LMT window 221 for the LMT 2. In some embodiments, the attachments 6 are sized to correspond to the LMT windows 221, the FMT windows 121, the largest bolt hole 33, and/or the WDHT windows 81. In some embodiments, the attachment 6 is a pointed attachment 62 in order to provide for a narrower application of the marker and can be used in holes. In some embodiments, the pointed attachment 62 can be ⅝ inch (1.587 centimeters) by 1⅜ is used for directing marker down a deep narrow hole.

In some embodiments, the attachment 6 comprises a housing attachment 61 comprising one or more attachment housing entry holes 63. In some embodiments, the attachments 6 comprise a stencil 7 that can be coupled to the attachment 61. In some embodiments, the pointed attachment 62 comprises a plastic, rubber, and/or elastic tip (in some embodiments measuring ⅝ inch (1.587 centimeters) by 1⅜ inches (3.492 centimeters)), which can then be used to mark deep narrow holes. In some embodiments, the marking gun 4 may be used to mark the pre-measured slotted windows of the templates to guide the marker to the desired location. The multiple attachments 6 have multiple shapes and sizes to allow for the creation of small to large markings.

FIG. 8 is an illustrative representation of an embodiment of the WDHT 8. In some embodiments, the WDHT 8 comprises a see-through material so that the FMT 1, is visible through the WDHT base 83. The width of the WDHT base 83 can be sized (in some embodiments 4.250 inches (10.79 centimeters) to give maximum viewing of the FMT 1. The WDHT 8 comprises the WDHT wings 84 and WDHT overhangs 85 that can be placed onto the plates 9. The WDHT 8 then can slide along the plates 9 easily to the desired measurement. In some embodiments, the WDHT wings 84 have just over the width of 1.5 inches (3.81 centimeters) (e.g., 1.5625 inches (3.969 centimeters) approximately). In some embodiments, the WDHT base 83 is designed so that it will abut or be near the LMT face 21 and/or the FMT face 11, and depth of the WDHT base 83 will depend on the thickness of the LMT 2 and FMT 1 and the plates 9 (e.g., 2×4, 2×6). The WDHT wings 84 ride atop the 2×4 or 2×6 plates 9 standing on edge. In some embodiments, the width of the WDHT base 83 is the same as the width of the FMT face 11. In some embodiments, the depth of the WDHT overhang 85 is that of the plate 9 (in some embodiments, the plate 9 is a 2×4) plates 9 down to just above the FMT 1. In some embodiments, the depth of the WDHT 8 can be about, or a little less than, 5.5 inches (13.97 centimeters) deep for accepting 2×6 wall plates 9, and this enables a user to read the scale on the increased height of the 2×6 plate on end. In some embodiments, the thickness of the WDHT 8 can be 0.125 inches (0.3175 centimeters). Some embodiments comprise a WDHT centerline 86 that runs across the WDHT base 83 and between the WDHT windows 81. The WDHT centerline 86 can signify the WDHT centerline 86 of the king and trimmer studs. This enables a user to read the FMT 1, through the WDHT base 83 and move the WDHT 8 to the right position to be marked by marking gun 4, or another marker. In some embodiments, the length of the WDHT 8 (in some embodiments the width is approximately ten inches) is such that it keeps the WDHT 8 in a true position for accurate measuring and marking (e.g., 10 inches (25.4 centimeters)). In some situations, the width of the king and trimmer studs placed together is, or about, 3⅛ inches (7.938 centimeters), and the width of WDHT windows 81 are 0.3875 inches (0.9843 centimeters). In some embodiments, the thickness of the WDHT 8 is, or about, 0.125 inches (0.3175 centimeters). In some embodiments, the WDHT overhangs 85 keep the plates 9 in position tight against the FMT 1 for accurate measuring and marking.

FIG. 9 is an illustrative representation of an embodiment of a WDHT 8 in use with an embodiment of the LMT 2. The WDHT 8 overhangs keep the plates 9 cinched against the LMT 2 and allows free movement of the WDHT 8 when in the right position. The WDHT centerline 86 on WDHT 8 is easy to read against the linear dimensional designations 24. Once the desired location is set, a mark can be made on the plates 9 through the WDHT windows 81. It is understood that the FMT 1 can also be used, in much the same way as the LMT 2, with the WDHT 8.

Many stencils 7, a type of attachment 6, can be used. A non-exhaustive list of examples for different stencils 7 is listed below. The stencils 7 can be used to help employees, sub-contractors, customers, and/or DIY relay standard construction instructions. They can be used to indicate plumbing and electrical runs and HVAC positions. In some embodiments, the stencils 7 are plastic and represent construction symbols, abbreviations, and general instructions. In some embodiments, the stencils 7 and the housing attachment 61 are configured such that the stencils 7 are slid into the housing attachment 61. The different marking guns 4 can have different size attachments 6 and stencils 7. It is understood that the size of the attachments 6 and stencils 7 can vary depending on the output of the marker for each gun. The stencils 7 can include common command instruction symbols and abbreviations used in specific construction trades, such as electricians and plumbers, for example. The use of the stencils 7 can give critical instructions to employees or sub-contractors to save time and money or just communicate with decision-makers.

Figure 10:
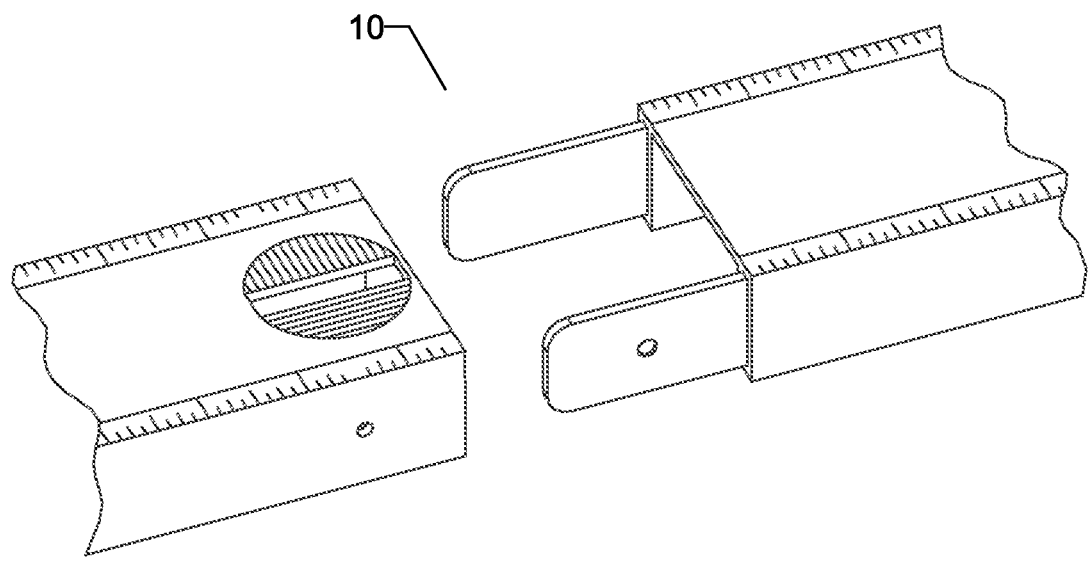
FIGS. 10 and 11 are illustrative representations of embodiments of extension attachments.
Figure 11:
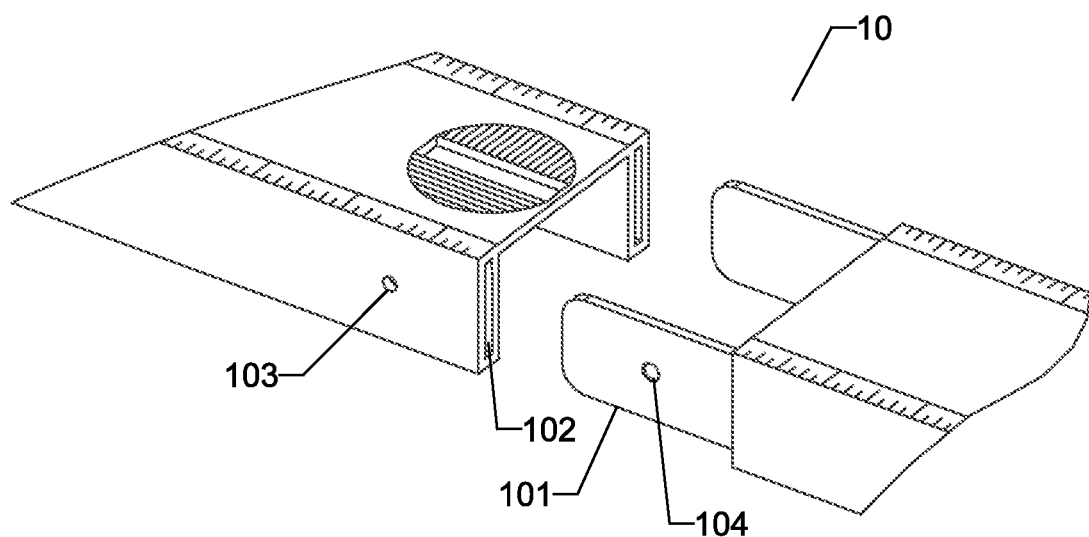
Figure 14:
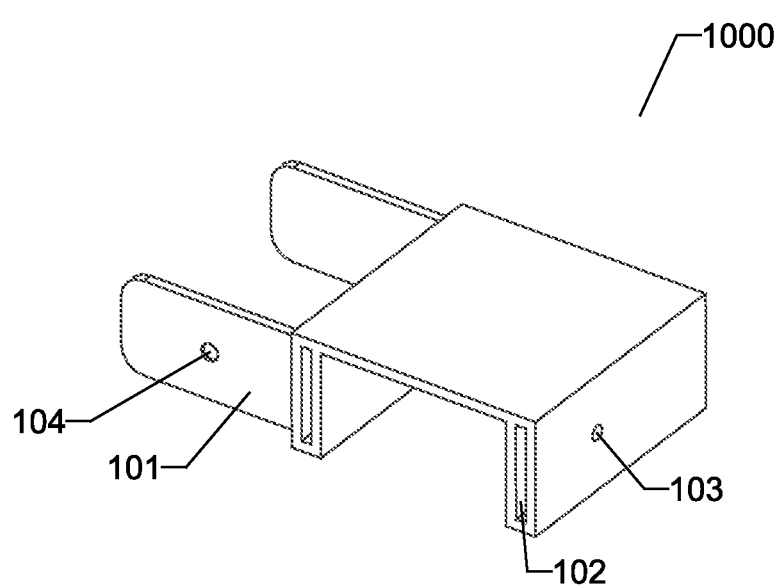
FIG. 14 is an illustrative representation of an embodiment of an angled connection.

As can be seen in FIGS. 10, 11, and 14, show embodiments of extension attachments 10 that enable extensions of FMT 1 can be attached to form a unitary longer FMT 1. Embodiments of the extension attachment 10 can also be used with the LMT 2. It is understood that the extension attachments 10 can be stand alone elements or be integral with the FMT 1 and the LMT 1. The extension attachments 10 can comprise inserts 101, insert lock 104, acceptance groove 102, and/or acceptance lock 103. In some embodiments, the insert lock 104 and the acceptance lock 103 are a detent system that allows for an interference fit. In some embodiments, the insert lock 104 and acceptance lock 103 comprise external pins that are inserted through the insert lock 104 and acceptance lock 103. In some embodiments, the templates are held in place by an interference fit between the inserts 101 and acceptance groove 102. As seen in FIG. 14, an embodiment of an angled connection 1000 is shown. The angled connection 1000 allows for extensions of the FMT 1 and the LMT 2 to be attached to each other but at an angle. In some embodiments, the angle is set at 90 degrees. As such, many shapes using the extensions can be formed. In some embodiments, a rectangle can be formed using extensions, extension attachments 10, angled connection 1000, and combinations thereof.

As examples, here is a list of some of the stencils 7, but not limited to, that can be used.

Plumbing
1. Copper pipe=C ½", C ¾", C 1", C 1¼", Cl ½", C 2", C ½", C 3", C 4"
2. Black Pipe=B ½", B ¾", B 1", B 1¼", B 1½", B 2", B 2½", B 3", B 4"
3. Galvanized=G ½", G ¾", G 1", G 1¼", G 1½", G 2", G 2½", G 3", G 4"
4. Brass=Br ½", Br ¾", Br 1", Br 1¼", Br 1½", Br 2", Br 2½", Br 3", Br 4"

Drain Pipe
5. ABS 1½", ABS 2", ABS 3", ABS 4", ABS 6"
6. PVC ½", PVC ¾", PVC 1", PVC 1¼", PVC 1½", PVC 2", PVC 3", PVC 4", PVC 5"

Electric
1. Outlet
2. Ceiling fan=CLNG FAN
3. SCONCE
4. 3 way switch=3WS
5. 4 way switch=4WS
6. Single pole switch=SPS
7. Exhaust fan=EF
8. Recessed light=RL
9. Security Camera=SC
10. Wall Light=WL
11. Single Gang=SG
12. Double Gang=2G
13. Triple Gang=3G
14. Four Gang=4G
15. Five Gang=5G
16. Chandelier light=Chdlr LT
17. Security Light=S Lght HVAC
1. Heat and air vent=HAC VNT HVAC total 2
2. Cool Air return=CAR Miscellaneous Attachments
1. LEVEL/FLOOR
2. NUMBERS 1, 2, 3, 4, 5, 6, 7, 8, 9, 0
3. Rubber tip for deephole markings.
4. Replace
5. Framing attachment
6. Directional arrow
7. Three various hole size diameter attachments.
8. Hot
9. Cold
10. Wet

EMBODIMENTS OF METHODS OF USE

An embodiment of a method of use comprises:
A) providing FMT 1;
B) placing the FMT 1 on a table or the ground;
C) optionally attaching one or more additional FMTs 1, and in some embodiments, the additional FMTs 1 are attached by magnetic mechanism and/or catch mechanism at the end of the FMT 1.
D) placing bottom and top plates 9 in the channel 13;
E) abutting the plates 9 against the FMT stop 15;
F) Lay the FMT 1 down and place sill plates 9 next to the template and against the outer template tight back on stops;
G) Mark the plates 9 through the FMT window 121;
H) Remove the FMT 1;
I) Secure structural members at each marked location along the plates 9.

In some embodiments, the marking is made by a marking gun 4.

If a window or door is present in the framed wall, the FMT 1 can be used in conjunction with the WDHT 8.

An embodiment of a method for using a WDHT 8:
A) Placing plates 9 adjacent to the FMT 1 or LMT 2 sides and placing WDHT overhangs 85 on the plates 9;
B) adjusting the location of the WDHT 8 by aligning the WDHT centerline 86 with the desired location;
C) Marking the plates 9 through the WDHT window 81 to create WDHT markings; and
D) attaching structural members at the WDHT markings.

In some embodiments, the marking is made by a marking gun 4.

An embodiment of using the embodiment of LMT 2, comprising:
A) Locate an existing structural member that is hidden behind a structure;
B) locate a LMT window 221 on the structure at the point where the existing member is located;
C) marking the structure that correspond to one or more other structural members behind the structure through the LMT windows 221.

In some embodiments, the marking is made by a marking gun 4.

An embodiment of using an embodiment of the FBT 3:
(A) Providing a FBT 3, wherein the FBT 3 defines one or more bolt holes 33 (in some embodiments the bolt holes 33 that are sized ½ inch (1.27 centimeters), ⅝ inch (1.587 centimeters), ¾ inch (1.905 centimeters), and/or ⅞ inch (2.222 centimeters) diameter holes);
B) Align a plate 9 with a marker line 97
C) Slip an appropriate bolt hole 33 over a bolt.
E) create an applied line using the centerline groove 34 across the plate 9 to the bolt.
F) Aligning the sliding square 32 in the center of the plate 9 or an edge thereof with the marker line 97;
G) secure the sliding square 32 in relation to the appropriate bolt hole 33;
H) Realign the sliding square 32 with an edge of the plate 9;
I) Line up the appropriate bolt hole 33 with the applied line, such that the applied line is aligned with the center of the appropriate bolt hole 33.
(J) mark the plate 9 through the appropriate bolt hole 33.
(K) repeat one or more of the steps A) through J).

In some embodiments, the marking is made by a marking gun 4.

An embodiment of a method of using an embodiment of a marking gun 4, comprising:
(A) Obtaining a marking gun 4 and a template.
(B) Applying a mark through a window of the template using the marking gun 4
(C) Attaching an attachment 6 to the marking gun 4.

(D) Marking a surface with the marking gun 4 using a stencil 7, which is an attachment 6.

(E) applying a mark through a hole using a pointed attachment 62, which is an attachment 6.

(F) Marking holes for mailboxes, gate mounts to walls, railings, wood construction connectors on surfaces, laying out bolt locations on top of foundation forms, or a combination thereof.

(G) wherein the template is a FMT 1, a LMT 2, FBT 3 and/or a WDHT 8.

H) wherein the tip comprises a hard or flexible material.

(I) wherein the marking gun 4 is a is a single output or multiple output.

(J) applying construction symbols, abbreviations, general instructions, or a combination thereof using a stencil 7 with the marking gun 4.

K) sliding a stencil 7 into a housing attachment 61 coupled to the marking gun 4.

L) Attaching an attachment 6 to the marking gun 4 by employing a magnet 691;

M) marking a surface to indicate the location of the installation of fire sprinklers, gas lines, plumbing lines or fixtures, electrical wiring, exhaust fan, security lighting, lighting type, outlet, framing and wood construction connectors or laying out duct locations, HVAC systems, or combinations thereof using a stencil 7 that has a corresponding marking for the installation of fire sprinklers, gas lines, plumbing lines or fixtures, electrical wiring, exhaust fan, security lighting, lighting type, outlet, framing and wood construction connectors or laying out duct locations, HVAC systems, or combinations thereof.

A) Marking infected items with "Replace," using a Replace stencil 7.

An embodiment of marking items comprising:

A) Marking infected items with "Replace," using a Replace stencil 7.

B) Showing someone the marked structures.

It is apparent, to one skilled in the art, from the method described above, there are many other applications for instruction stencil 7.

Embodiments of the invention, when used separately or together, can provide for many benefits, including, but not limited to Eliminating the need a tape measure, a sliding square 32, a level or a pencil and in many cases, a costly assistant needed to accomplish layout or framing tasks; Eliminating some errors common in framing and structure building;

A tape measure usually requires a second person to assist with the measuring and marking of layout or framing projects. If attempting such projects without assistance, the tape measure end frequently slips off the end of the board is measured. Tape measures are often held in place by stepping on it to hold it stable, but this can break the tape measure or cause the end to slip off the material being measured. One or some of the embodiments eliminate the need for a tap measure.

Pencil marks are often not able to be seen in the parts of lumber with dark sections. Pencil points often break, and it is a scramble on a job site to sharpen the pencil. Pencil marks often do not stand out on construction materials such as roofing, flooring, stucco, etc. One or some of the embodiments eliminate the need for a pencil or provide an improvement over marks by pencil.

Some embodiments can assist in mounting T. V. wall mount brackets, shower door rails, railings, mailboxes, hose caddies, shingles, and solar panel brackets, and they do not require remarking or result in damage to the material by pressing too hard when trying to leave a pencil mark.

Many people are not skilled in the math required for measuring 16 inches (40.64 centimeters) and 24 inches (60.96 centimeters) on center markings over a long distance. The FMT 1 simplifies the task automatically, marking either 16 inches (40.64 centimeters) or 24-inch (60.96 centimeters) locations as needed and marking both upper and lower plates 9 at once. Windows/slots (121, 221, 81) being at preset locations along its length that correspond to Standard Uniform Building Code widths for framing walls, roofs, decks, floors, and other structures. One or some of the embodiments assist workers, skilled and unskilled, in the building of structures.

One or some of the embodiments allow for two boards to be marked simultaneously and decrease the time required while increasing accuracy. One or some of the embodiments eliminates measuring errors because 16 inch (40.64 centimeters) and 24 inches (60.96 centimeters) are preset and cannot be increased or decreased by a shifting tape measure or faulty math.

One or some of the embodiments allow for marking for preset windows (121, 221, 81, 33), and since the windows/slots (121, 221, 81, 33) are at the standard widths, measuring errors are eliminated.

One or some of the embodiments eliminates the need for holding both a tape measure and a level at the same time is not needed, which reduces errors caused by juggling two tools at once.

One or some of the embodiments have linear dimensions marked on them like a tape measure and holes punched at 16 inches (40.64 centimeters) and 24 inches (60.96 centimeters) on center locations like a tape measure.

One or some of the embodiments enable leveling, allowing for simple leveling and marking studs within a wall or ceiling along a substantially a straight line that avoids uneven location of switches, outlets, recessed lighting, or other items that require visual symmetry.

One or some of the embodiments provide clear, visually distinct markings by dispersing marker through the windows (121, 221, 81, 33) of a template that indicates what is to be done at the marking. One or some of the embodiments uses uniform symbols resulting in reduced mistakes at the construction site. Varying marker colors can be used to align with common construction site color designations that also eliminates errors during the building process One or some of the embodiments employ chalk as a marker, which is an easily removable marker compared to pencil, pen, or paint as a marker.

One or some of the embodiments assist in finding foundation bolt locations and placement and prevent errant locations and oblong holes that can lead to the plate 9 cracking and failing due to inaccurate measurements.

One or some of the embodiments assist in measuring for window (121, 221, 81, 33), door header, and stud locations without the need to continually pull out a tape measure; thus eliminating fatigue and tedious work strain from continued bending up and down throughout the day, which leads to faulty measurements and loss time and material.

One or some of the embodiments assist in eliminating mistakes by electricians, plumbers, architects, designers, interior decorators, and laymen that place objects in undesired locations caused by faulty marking, thus preventing delays, increased costs, and arguments between contractors, subs, and owners. One or some of the embodiments assist in marking all the necessary places with the proper identification to eliminate these errors and conflicts, by using stencils 7 that result in easily identifiable markings.

One or some of the embodiments assist in some situations where one person is trying to measure and mark for multitudes of procedures, where two hands are not enough creating wasted time and material.

In some embodiments, the windows 121, 221, and/or 81 can have different shapes to distinguish the markings made through them. In some embodiments, the windows 121, 221, and/or 81 will have a base that corresponds to the width of a 2×4 or a 2×6, yet the top part of the windows can have different shapes. For example, one of the windows can be straight, another can have a pointed top (e.g, a tringle shape), and/or the other can have a wavy shape.

The terms "certain embodiments," "an embodiment," "embodiment," "embodiments," "the embodiment," "the embodiments," "one or more embodiments," "some embodiments," and "one embodiment" mean one or more (but not all) embodiments unless expressly specified otherwise. The terms "including," "comprising," "having," and variations thereof mean "including but not limited to", unless expressly specified otherwise. The enumerated listing of items does not imply that any or all the items are mutually exclusive, unless expressly specified otherwise. The terms "a," "an," and "the" mean "one or more," unless expressly specified otherwise.

While this invention has been described in terms of several embodiments, there are alterations, permutations, and equivalents, which fall within the scope of this invention. It should also be noted that there are many alternative ways of implementing the methods and apparatuses of the present invention. Furthermore, unless explicitly stated, any method embodiments described herein are not constrained to a particular order or sequence. Depending on the embodiment, certain steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

Further, any Abstract that is provided herein is for convenience and should not be employed to construe or limit the overall invention, which is expressed in the claims. It is therefore intended that the following appended claims be interpreted as including all such alterations, permutations, and equivalents as fall within the true spirit and scope of the present invention.

The invention claimed is:

1. An apparatus comprising:
a template comprising:
a face; and
two or more indicators, wherein the two or more indicators are located at one or more predetermined intervals on the face; and each indicator defines a window;
wherein each window is of a predetermined length; each indicator is coded to indicate that each indicator is located at one of the one or more predetermined intervals.

2. The apparatus of claim 1, wherein there are two or more predetermined intervals, and at least one indicator is located at a convergence of the two or more predetermined intervals.

3. The apparatus of claim 1, further comprising a framing channel configured to accept at least a portion of two plates therein.

4. The apparatus of claim 3, wherein the framing channel is at least partially defined by a framing marking template overhang.

5. The apparatus of claim 1, further comprising one or more stops that extend perpendicular to the face.

6. The apparatus of claim 1, wherein the face displays linear dimensional designations.

7. The apparatus of claim 1, wherein each window has at least one dimension that corresponds to a predetermined structural member.

8. The apparatus of claim 7, where the predetermined structural member is a 2×4 or a 2×6.

9. The apparatus of claim 7, wherein each window has a straight base and a non-straight top.

10. The apparatus of claim 1, further comprising a slide stop, wherein the slide stop is retractable.

11. The apparatus of claim 5, wherein the one or more stops are configured to rotate to and from an extended position, wherein the extended position is perpendicular to the face.

12. The apparatus of claim 1, further comprising one or more levels.

13. An apparatus of claim 1 further comprising:
one or more inserts; and
one or more acceptance grooves; wherein the one or more acceptance grooves are shaped and sized to accept inserts from a second template.

14. An apparatus of claim 1 further comprising:
a second template, wherein the second template comprises one or more second template inserts; and
an angled connection comprising:
one or more angled connection inserts; and
one or more angled connection acceptance grooves;
wherein the one or more angled connection acceptance grooves are shaped and sized to accept inserts from a second angled connection; and the one or more angled connection inserts are set at an angle with respect to the one or more angle connection acceptance grooves, and the angle is greater than 0 degrees
wherein the template defines one or more template acceptance grooves, and the corresponding one or more one or more angled connection inserts are located therein; and the one or more second template inserts are located in the corresponding one or more angle connection acceptance grooves.

15. The apparatus of claim 14, wherein the angle is 90 degrees.

16. A method comprising:
providing a template; wherein the template comprises:
a face; and
two or more indicators, wherein the two or more indicators are located at one or more predetermined intervals on the face; and each indicator defines a window;
wherein each window is of a predetermined length; each indicator is coded to indicate that each indicator is located at one of the one or more predetermined intervals; and the template defines a framing channel;
placing two plates in the framing channel;
marking the two plates through the window with a marking, wherein the window exposes at least a portion of each plate.

17. The method of claim 16, wherein the predetermined length corresponds to a length of a 2×4 or a 2×6.

18. The method of claim 16, wherein the one or more predetermined intervals equates to 16 inches (40.64 centimeters), 24 inches (60.96 centimeters) on center, or a combination thereof.

19. The method of claim 16, further comprising:
securing a structural member to the two plates at a location of the marking.

20. A method comprising:
providing a template comprising:
- a face; and
- two or more indicators, wherein the two or more indicators are located at one or more predetermined intervals on the face; and each indicator defines a window;

wherein each window is of a predetermined length; each indicator is coded to indicate that each indicator is located at one of the one or more predetermined intervals;

applying at least two markings on a surface member through at least two of the windows; and securing the surface member to a structural member that is located behind the surface member at a location of the at least two markings.

21. The method of claim 20, further comprising leveling the template, wherein the template further comprises one or more levels.

22. The method of claim 20, further comprising providing a marking gun, wherein the marking gun comprises:
- a marker container;
- a propellant canister;
- a supply tube; and
- an expulsion chamber;

wherein the marker container is coupled to the expulsion chamber by the supply tube, and the propellant canister is coupled to the expulsion chamber; the marking gun is configured to expel marker out of the expulsion chamber;

wherein the applying the at least two markings is performed by the marking gun.

* * * * *